United States Patent
Zinger et al.

(10) Patent No.: US 10,352,470 B2
(45) Date of Patent: Jul. 16, 2019

(54) CONTROL VALVE AND AIR STARTING SYSTEM

(71) Applicant: GE Aviation Systems LLC, Grand Rapids, MI (US)

(72) Inventors: Marc David Zinger, Dayton, OH (US); James Thomas Zalusky, Beavercreek, OH (US); Eric Sidney Roslund, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 125 days.

(21) Appl. No.: 14/943,188

(22) Filed: Nov. 17, 2015

(65) Prior Publication Data

US 2017/0138501 A1 May 18, 2017

(51) Int. Cl.
| | |
|---|---|
| *F16K 31/00* | (2006.01) |
| *F16K 31/06* | (2006.01) |
| *F02N 9/04* | (2006.01) |
| *F16K 1/12* | (2006.01) |
| *F16K 15/02* | (2006.01) |

(Continued)

(52) U.S. Cl.
CPC ............ *F16K 31/0655* (2013.01); *F02N 9/04* (2013.01); *F16K 1/12* (2013.01); *F16K 15/028* (2013.01); *F16K 15/18* (2013.01); *F16K 31/0658* (2013.01); *F16K 31/082* (2013.01)

(58) Field of Classification Search
CPC ............ F15K 31/0655; F15K 31/0658; F15K 31/082; F16K 15/18; F16K 15/028; F16K 1/12; F02N 9/04
See application file for complete search history.

(56) References Cited

U.S. PATENT DOCUMENTS

| | | | | | |
|---|---|---|---|---|---|
| 2,714,802 | A | * | 8/1955 | Wosika | .................... F02C 7/27 60/39.19 |
| 2,964,286 | A | * | 12/1960 | Hoskins | ............... F16K 31/408 251/30.04 |

(Continued)

FOREIGN PATENT DOCUMENTS

| | | |
|---|---|---|
| CH | 679327 A5 | 1/1992 |
| CN | 1724913 A | 1/2006 |

(Continued)

OTHER PUBLICATIONS

Combined Search and Examination Report issued in connection with corresponding GB Application No. 1619381.5 dated May 31, 2017.

(Continued)

*Primary Examiner* — Hieu T Vo
*Assistant Examiner* — Sherman D Manley
(74) *Attorney, Agent, or Firm* — McGarry Bair PC

(57) ABSTRACT

A control valve and an air starting system for an engine having a pressurized air source, an air starter, and a control valve. The control valve having a housing defining a flow passage with an inlet port fluidly coupled to the pressurized air source and an outlet port fluidly coupled to the air starter, a valve body movable between an opened and closed positions to selectively open and close one of the inlet and outlet ports, resulting in a corresponding opening and closing of the control valve, and a linear motor operably coupled to the valve body to move the valve body between the opened and closed positions.

20 Claims, 5 Drawing Sheets

(51) Int. Cl.
*F16K 31/08* (2006.01)
*F16K 15/18* (2006.01)

(56) References Cited

U.S. PATENT DOCUMENTS

| | | | | |
|---|---|---|---|---|
| 3,424,951 | A * | 1/1969 | Barker | F16K 31/0651 137/1 |
| 3,449,923 | A * | 6/1969 | Kivioja | F25B 41/00 137/503 |
| 3,572,306 | A * | 3/1971 | Hurlimann | F02N 9/04 123/179.31 |
| 3,587,228 | A * | 6/1971 | Clements et al. | F02N 9/04 123/179.31 |
| 3,776,266 | A * | 12/1973 | Bass | F02C 7/268 137/489 |
| 4,082,116 | A * | 4/1978 | Stampfli | F16K 31/0655 137/630.14 |
| 4,326,696 | A * | 4/1982 | Ishikawa | F16K 31/0606 137/625.65 |
| 4,799,645 | A * | 1/1989 | Kramer | F16K 31/406 251/30.04 |
| 4,828,219 | A * | 5/1989 | Ohmi | F16K 7/14 251/118 |
| 4,899,534 | A * | 2/1990 | Sorenson | F02C 7/277 192/45.1 |
| 5,088,520 | A * | 2/1992 | Haynes | F16K 31/0655 137/270 |
| 5,131,627 | A * | 7/1992 | Kolenc | F16K 41/12 251/331 |
| 5,188,017 | A * | 2/1993 | Grant | F17C 13/04 137/630.15 |
| 5,295,662 | A * | 3/1994 | Yamaji | F16K 41/12 251/274 |
| 6,092,550 | A * | 7/2000 | Gotch | F16K 7/16 137/331 |
| 6,269,834 | B1 * | 8/2001 | Huhnen | F15B 13/0817 137/269 |
| 6,684,898 | B2 * | 2/2004 | Wiggins | F02C 7/277 137/15.25 |
| 7,066,710 | B2 * | 6/2006 | Wiggins | F16K 31/1635 137/488 |
| 7,334,770 | B2 * | 2/2008 | Wang | F02M 59/366 123/458 |
| 7,802,771 | B2 * | 9/2010 | Tsubota | F16K 31/1221 251/331 |
| 8,066,255 | B2 * | 11/2011 | Wang | F16K 31/408 251/30.03 |
| 9,650,947 | B1 * | 5/2017 | Egami | F16K 31/406 |
| 2001/0028049 | A1 * | 10/2001 | Mamyo | F16K 7/14 251/63.5 |
| 2007/0187634 | A1 * | 8/2007 | Sneh | F16K 7/14 251/30.01 |
| 2008/0023661 | A1 * | 1/2008 | Gu | F16K 7/17 251/30.01 |
| 2010/0072812 | A1 * | 3/2010 | Voss | B60T 8/363 303/119.3 |
| 2010/0090151 | A1 * | 4/2010 | Tanikawa | F16J 3/02 251/331 |

FOREIGN PATENT DOCUMENTS

| | | |
|---|---|---|
| EP | 1186815 A2 | 3/2002 |
| JP | S49-42519 U | 4/1974 |
| JP | 537831 U | 1/1978 |
| JP | 53104437 U | 8/1978 |
| JP | 5440521 U | 3/1979 |
| JP | S62-170471 U | 10/1987 |
| JP | H03-105784 U | 11/1991 |
| JP | H07-332534 A | 12/1995 |
| JP | H11-37018 A | 2/1999 |
| WO | 2005097792 A1 | 10/2005 |
| WO | 2008005838 A2 | 1/2008 |
| WO | 2011/061777 A1 | 5/2011 |
| WO | 2015/156761 A1 | 10/2015 |

OTHER PUBLICATIONS

Machine Translation and Notification of Reasons for Refusal issued in connection with corresponding JP Application No. 2016-217712 dated Dec. 19, 2017.

Machine translation and a Japanese Office Action issued in connection with corresponding JP Application No. 2016217712 dated Jul. 24, 2018.

Machine Translation and First Office Action and Search issued in connection with corresponding CN Application No. 201611011716.7 dated Sep. 3, 2018, 32 pages, People's Republic of China.

* cited by examiner

CONTROL VALVE AND AIR STARTING SYSTEM

BACKGROUND OF THE INVENTION

A reciprocating engine, such as an internal combustion engine, is a heat engine that uses one or more reciprocating pistons to convert pressure into a rotating motion. In a typical example, a piston is housed in a sealable piston chamber or pressure chamber, and attached at its base to a rotatable shaft. As the piston slides along the piston chamber, the rotatable shaft is rotated, and vice versa.

An air turbine starter (ATS) can be used to initiate the rotation of the engine. The ATS is often mounted near the engine and can be coupled to a high pressure fluid source, such as compressed air, which impinges upon a turbine wheel in the ATS causing it to rotate at a relatively high rate of speed. The ATS includes an output shaft that is coupled to the turbine wheel and, perhaps via one or more gears, to the engine. The output shaft thus rotates with the turbine wheel. This rotation in turn causes the engine to begin rotating.

The flow of compressed air to the ATS can be controlled by, for example, a valve. This valve is typically referred to as a starter air valve or control valve. When the starter air valve is open, compressed air can flow through the starter air valve, and into the ATS. Conversely, when the starter valve is closed, compressed air flow to the ATS can be prevented. A starter air valve, in many instances, includes a pneumatic actuator to move the valve into its open position. The source of pneumatic power to the actuator can be pressurized air supplied from, for example, an auxiliary power unit (APU), bleed air from another engine compressor, etc.

BRIEF DESCRIPTION OF THE INVENTION

In one aspect, an embodiment of the invention relates to an air starting system for an engine including a pressurized air source, an air starter, and a control valve comprising a housing defining a flow passage with an inlet port fluidly coupled to the pressurized air source and an outlet port fluidly coupled to the air starter, a valve body movable between an opened and closed positions to selectively open and close one of the inlet and outlet ports, resulting in a corresponding opening and closing of the control valve, and a linear motor operably coupled to the valve body to move the valve body between the opened and closed positions, wherein the flow passage is sized to permit a flow rate of at least 900 scfm, and the linear motor moves the valve body between the closed and opened positions in a response time of 30 ms or less.

In another aspect, an embodiment of the invention relates to a control valve including a housing defining an interior, with an inlet port and an outlet port formed in the housing, wherein a flow passage is defined through the interior from the inlet port to the outlet port, a piston having a head and a shaft extending from the head and reciprocally movable between opened and closed positions for opening and closing at least one of the inlet and outlet ports, a biasing element applying a biasing force to the piston to urge the piston to the closed position, and a linear motor includes a permanent magnet mounted to the shaft and an electromagnetic coil circumscribing the shaft, wherein when electricity is passed through the electromagnetic coil it generates a magnetic field that interacts with the permanent magnet to apply a force to the shaft sufficient to overcome the biasing force to cause a movement of the piston from the closed position to the opened position.

DESCRIPTION OF EMBODIMENTS OF THE INVENTION

Contemporary starter air valves that can accommodate high flow rates are not very responsive. High flow rates typically include flow rates ranging from 900 scfm to over 1700 scfm. For example, valves that can accommodate flow rates of 1700 scfm take more than one second to fully open. A response time of one second or more is considered a slow response time. Conversely, valves that are very responsive cannot accommodate high flow. For example, valves that can open in less than 100 ms, which is considered a fast response time, can only accommodate flows as high as 300 scfm, flow rates of 300 scfm and below are considered low flow rates.

To accommodate high flow rates with existing slow response valves the common technique is to start the opening or closing process of the valve ahead of when the valve needs to be opened or closed. This can be done as far as five seconds ahead of time. This requires anticipation or prediction of what the system is going to do, rather than response to real-time system events and provides a risky approach, especially with transient systems where conditions are rapidly changing. Embodiments of the present invention provide a control valve assembly and an air starter system that provide improved valve opening characteristics as compared to presently known valve assemblies.

Embodiments of the invention can be implemented in any suitable environment including, but not limited to, an environment using a reciprocating engine regardless of whether the reciprocating engine provides a driving force or is used for another purpose, such as to generate electricity. For purposes of this description, such a reciprocating engine will be generally referred to as a combustion engine, or similar language. Such a combustion engine can be fueled by gasoline, natural gas, methane, or diesel fuel. Thus, a preliminary understanding of a combustion engine is provided.

Figure 1:
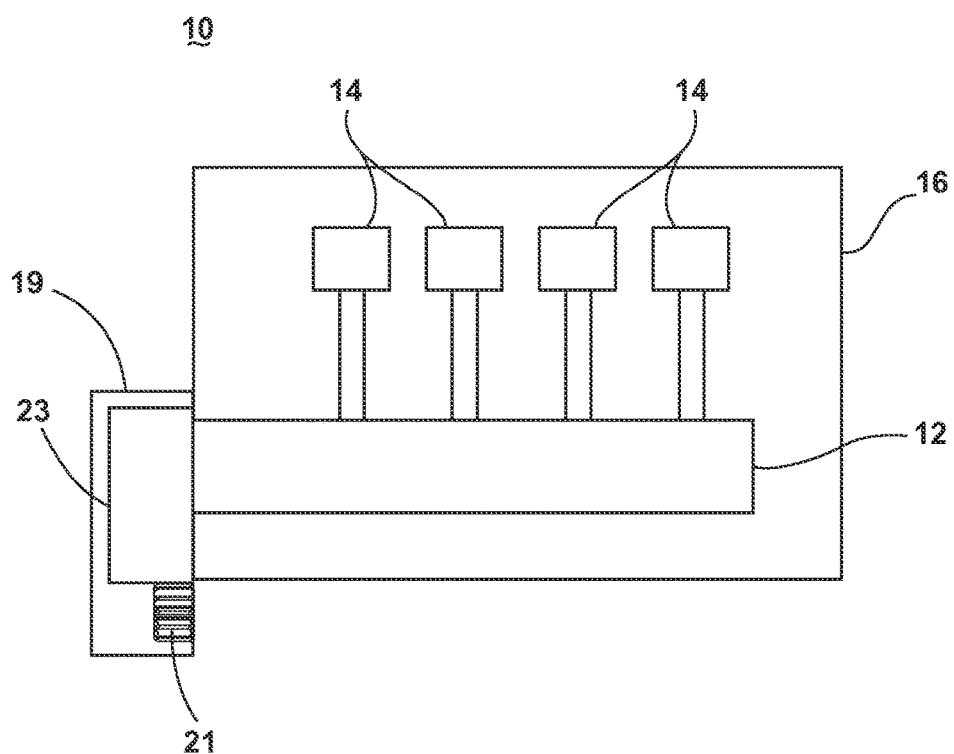
FIG. 1 is a schematic view of a combustion engine having a crank shaft that can utilize an air starting system according to an embodiment of the invention.
Figure 2:
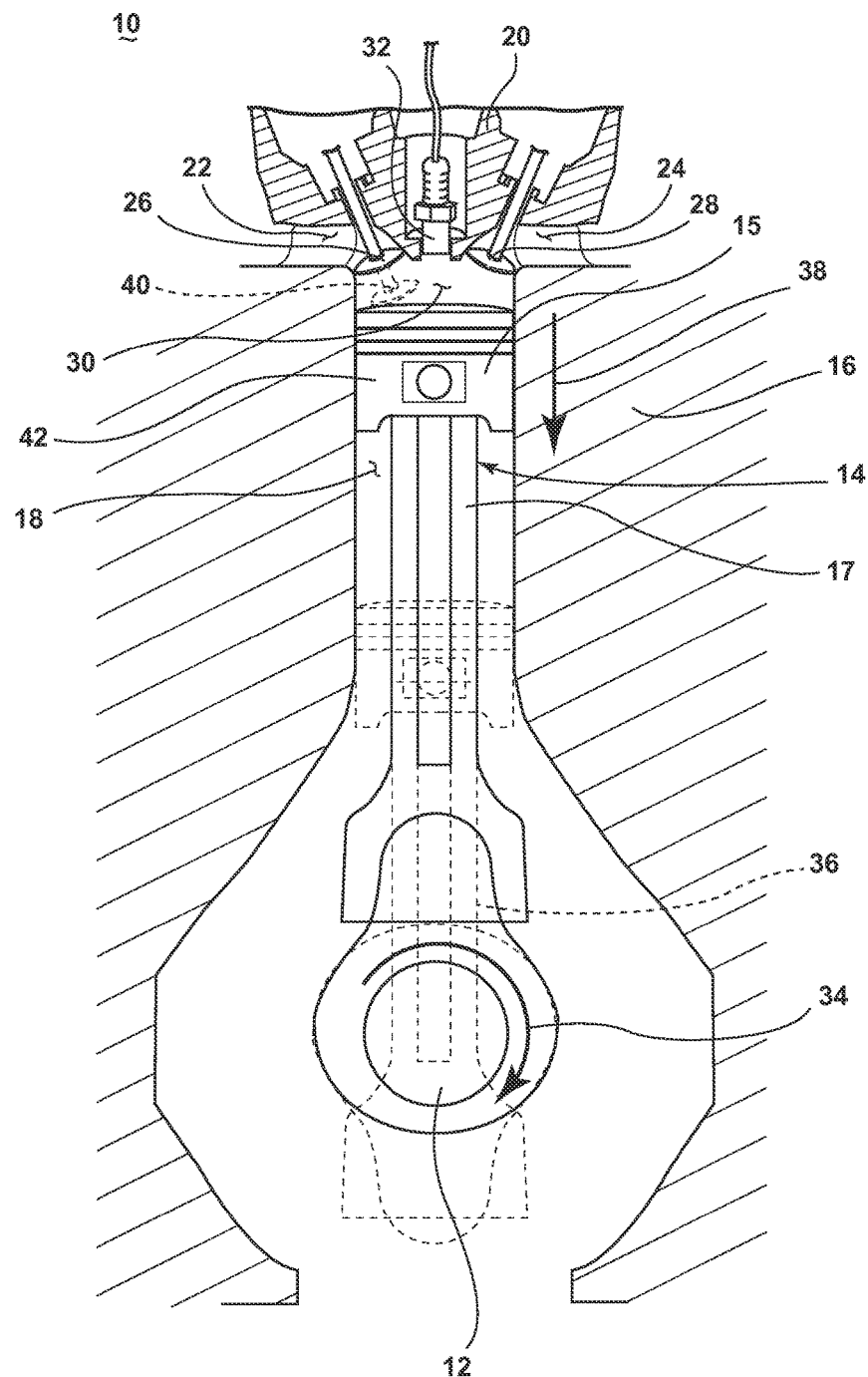
FIG. 2 is a schematic cross-sectional view of a piston in a combustion engine such as the engine of FIG. 1.

FIG. 1 illustrates a schematic view of a reciprocating engine, such as a combustion engine 10, having a rotatable shaft, such as a crankshaft 12, and at least one piston 14 located within an engine block 16. A gearbox 19 having a spline gear 21 and one or more internal gears or gear train 23 can be included and operably coupled with the crankshaft 12. As better illustrated in FIG. 2, the piston 14 located within the corresponding portion of the engine block 16 can include a piston head 15 rotatably coupled with a piston shaft 17, with the piston head being slidable within a piston chamber 18 (FIG. 2). The piston shaft 17 is rotatably coupled to a pin on the crankshaft 12, which is radially offset from a rotation axis of the crankshaft, such that rotation of the crankshaft 12 causes a reciprocation of the piston head 15 within the piston chamber 18.

While only one piston 14 is shown in FIG. 2, a combustion engine 10 typically has multiple pistons 14 contained within corresponding piston chambers 18, with the pistons 14 being mounted to different pins on the crankshaft 12, with the pins being radially spaced about the rotational axis of the crankshaft 12. The pistons 14 can be arranged in one or more linear rows, where an engine with only one row of linearly aligned pistons 14 being referred to as an inline arrangement. Engines 10 with multiple rows of pistons 14 can have an angular spacing between the rows forming. The pistons 14 can also be radially spaced about the crankshaft 12, which is often referred to as a radial arrangement.

The movement of the piston 14 into or out of the piston chamber 18 will, hereafter, be described as "strokes" or "piston strokes." While the disclosure can contain descriptions of "upward" strokes, wherein the piston 14 is moved farther into the piston chamber 18, away from the crankshaft 12, and "downward" strokes, wherein the piston 14 is removed from the piston chamber 18 toward the crankshaft 12, embodiments of the invention can include a combustion engine 10 having vertical, or angled strokes. Thus, the phrases "upward" and "downward" are non-limiting, relative terms for embodiments of the invention.

As shown, the combustion engine 10 can further include an engine head portion 20 having a sealable air intake passage 22 and a sealable exhaust passage 24. The passages 22, 24 are fluidly coupled with and sealable from the piston chamber 18 via a respective intake valve 26, and exhaust valve 28. Collectively, the piston head 15, engine block 16, head portion 20, intake valve 26, and exhaust valve 28 can define a sealable, compression chamber 30.

The head portion 20 can further include a fuel spray nozzle 32 for injecting a fuel, such as diesel fuel into the compression chamber 30 for combustion. While a fuel spray nozzle 32 for injecting diesel fuel is shown, alternative embodiments of the invention can include the fuel spray nozzle 32 optionally replaced by, in the example of a gasoline or natural gas engine, a spark plug for igniting an air/fuel or air/gas mixture for the combustion engine 10.

In one example, a combustion cycle the combustion engine 10 can include four piston strokes: an intake stroke, a compression stroke, a combustion stroke, and an exhaust stroke. The foregoing description assumes the combustion cycle of the engine 10 starts while the piston 14 is fully extended upward into the piston chamber 18, which is typically referred to as "top dead center" or TDC. During the intake stroke, a rotation of the crankshaft (illustrated by clockwise arrow 34) pulls the piston 14 out of the compression chamber 30 in a downward intake stroke (in the direction of arrow 38), creating a vacuum in the compression chamber 30. The vacuum draws in air from the sealable intake passage 22, which is unsealed due to the opening of the intake valve 26 (illustrated in dotted line 40) and timed to correspond with the intake stroke.

Once the piston 14 reaches the lowest point of its intake stroke (illustrated in dotted line 36), the intake valve 26 is sealed, and the piston begins an upward compression stroke. The compression stroke slides the piston 14 into the pressure chamber 30 compressing the air. At the TDC position of the compression stroke 42, the fuel spray nozzle 32 can inject diesel fuel into the compression chamber 30. Alternatively, a combustible fuel can be added to the intake air prior to the intake stroke, or fuel can be added to the compression chamber 30 during the compression stroke 42.

Combustion can occur in the compression chamber due to the high heat and high pressure of the compressed air/fuel mixture (for example, in a diesel engine), or, alternatively, due to external ignition, such as a spark generated by a spark plug (for example, in a gasoline or natural gas engine) in the compression chamber 30. During the combustion stroke, the explosion of the air/fuel mixture generates heat in the compressed gases, and the resulting expansion of the explosion and expanding gases drives the piston in a downward stroke, away from the compression chamber 30. The downward stroke mechanically drives the rotation 34 of the crankshaft 12.

Following the combustion, the exhaust valve 28 is unsealed to correspond with the exhaust stroke, and the piston is driven upward into the compression chamber 30 to push the combusted, or exhaust gases, out of the compression chamber 30. Once the piston 14 returns to the TDC position in the piston chamber 18, the combustion cycle of the engine 10 can then be repeated.

While a typical combustion engine 10 can have a set of pistons 14 and piston chambers 18, a single piston 14 is illustrated and described here for brevity. It will be understood that "a set" as used herein can include any number including only one. In a combustion engine 10 with multiple pistons 14, the pistons 14 can be configured along the crankshaft 12 to stagger the piston 14 strokes, such that one or more pistons 14 can be continuously providing a driving force to rotate the crankshaft 12, and thus drive the pistons 14 through additional combustion cycle strokes. The mechanical force generated by the rotation of the crankshaft 12 can be further delivered to drive another component, such as a generator, wheels, or a propeller.

Figure 3:
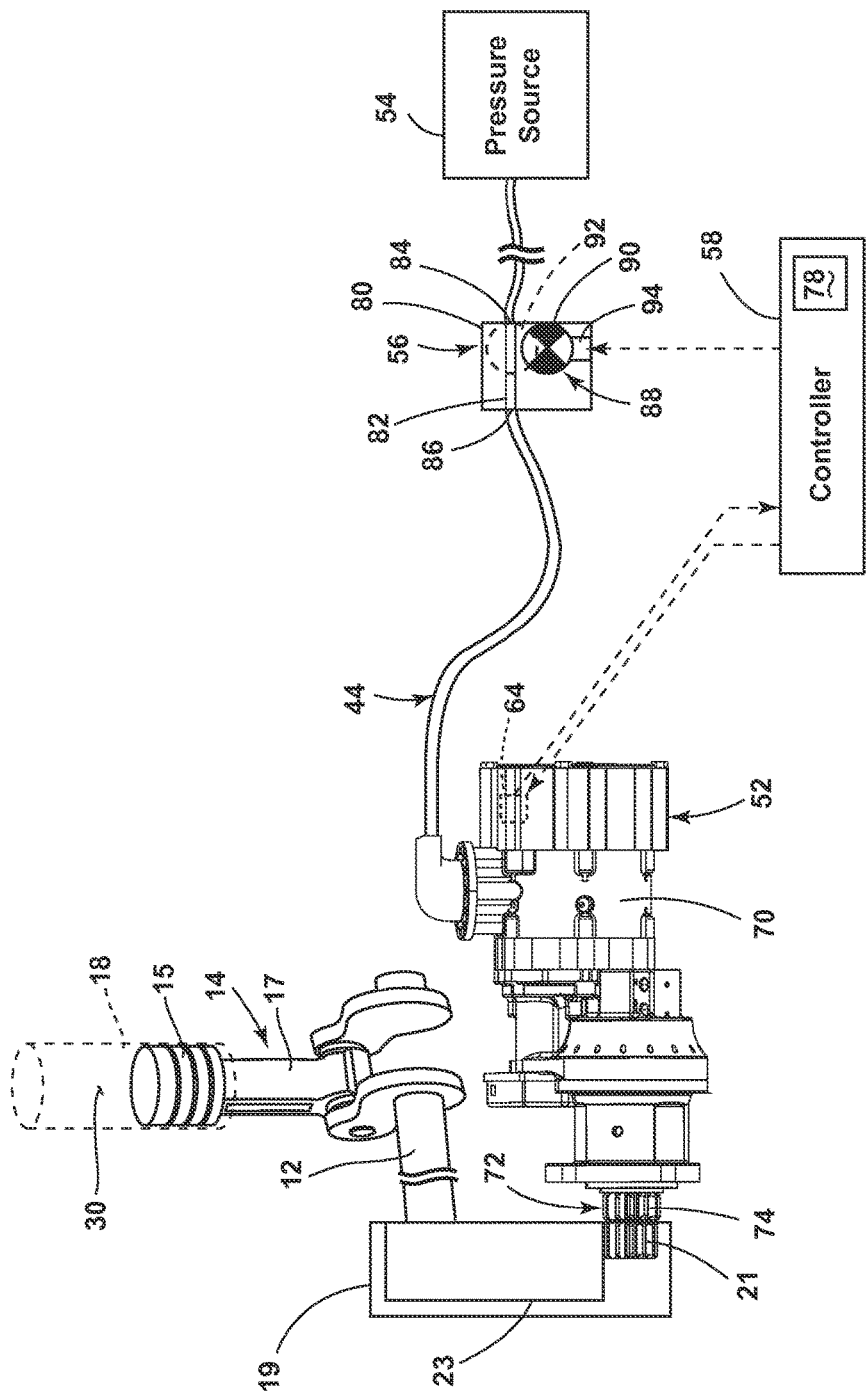
FIG. 3 is a schematic view of an air starting assembly rotationally coupled with the crankshaft of the engine of FIGS. 1 and 2, in accordance with an embodiment of the invention.

FIG. 3 illustrates an exemplary schematic configuration of an air starting system 44 such as for the combustion engine 10. The air starting system 44 can include an air starter 52 fluidly coupled with a pressure source 54 via a control valve 56, and a controller 58 or processor.

The air starter 52 is shown further including a body portion 70, a starter output 72, illustrated as a gear, having a set of teeth 74 keyed to mesh with the spline gear 21 of the gearbox 19, which is operably coupled to the crankshaft 12. It will be noted that this is typically the arrangement for starters on gas turbine engines. For starters on reciprocating engines, an external spur gear on the starter drive shaft can drive a large external spur gear or ring gear on the engine and such an engine ring gear can be coupled to the engine drive shaft.

A starter sensor 64 can also be included and be configured to sense or measure characteristics of the air starter 52, for example, the rotational speed of the starter output 72, the torque generated by the starter 52, etc. The sensor 64 can be further capable of generating an analogue or digital signal representative of the starter characteristics, and can provide the generated signal to the controller 58. Embodiments of the invention are envisioned wherein the starter 52 is, for example, mechanically or removably mounted to the engine 10. Alternatively, the starter 52 can be capable of controllably extending and retracting the starter output 72 portion of the starter 52, such that the teeth 74 can be engaged or disengaged only during starting operations. Additional configurations are envisioned.

The controller 58 can further include memory 78 including, but not limited to, random access memory (RAM), read-only memory (ROM), flash memory, or one or more different types of portable electronic memory, such as discs, DVDs, CD-ROMs, etc., or any suitable combination of these types of memory. The controller 58 can be operably coupled with the memory 78 such that one of the controller 58 and the memory 78 can include all or a portion of a computer program having an executable instruction set for controlling the operation of the control valve 56 and air starter 52. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, controller 58, or special purpose processing machine to perform a certain function or group of functions.

The control valve 56 has been illustrated as including a housing 80 defining a flow passage 82 with an inlet port 84 fluidly coupled to the pressurized air source 54 and an outlet port 86 fluidly coupled to the air starter 52. The flow passage can be sized in any suitable manner for the system including, but not limited to, that the flow passage 82 can be sized to permit a flow rate of at least 900 scfm. It is contemplated that the flow passage 82 can be sized to accommodate flow rates at least up to 1700 scfm. A valve body 88 movable between an opened position 90 and a closed position 92 (shown in phantom) to selectively open and close the inlet port 84 resulting in a corresponding opening and closing of the control valve 56 is also included. While the valve body 88 is illustrated as selectively opening and closing the inlet port 84 it will be understood that the valve body 88 could alternatively selectively open and close the outlet port 86 or another portion of the flow passage 82.

A linear motor 94 can be operably coupled to the valve body 88 to move the valve body 88 between the opened and closed positions. The linear motor 94 can move the valve body 88 in response to a control signal supplied by the controller 58. Further, the linear motor 94 can be configured to move the valve body 88 between the closed and opened positions in a response time of 30 ms or less. By way of further non-limiting example, it is contemplated that the linear motor 94 can move the valve body 88 between the positions in 25 ms or less. The linear motor 94 has a large travel distance as compared to a typical solenoid motor and this allows the linear motor 94 to move the valve body 88 fully between the opened and closed positions. Further, during operation the pull force generated by the linear moto 94 combined with the push force of the pressurized air move the valve body 88 away from the inlet port 84 within the desired response time.

During operation, the air starter 52 and control valve 56 operate to generate force, such as a torque at the starter output 72, in response to a provided supply of air pressure. The torque generated by the air starter 52 is applied (via the spline gear 21, gear train 23, and crankshaft 12) to generate the compression force used by the compression stroke 42 to compress the contents of the compression chamber 30. By way of non-limiting example, the air starting system 44 can be utilized for slow starting the combustion engine 10, wherein the slow starting of the combustion engine 10 prevents damage to the engine 10 if the compression chamber 30 contains an incompressible fluid, such as water. As used herein, "slow starting" is used to describe rotating the crankshaft 12 at a speed below operational or self-sufficient running, engine speed, such as an idle speed. The slow speed, or "slow roll" operation of the method can allow for issues or concerns regarding proper engine operation to be identified before any internal damage can occur to the engine 10. The air supplied by the control valve 56 to the air starter 52 can be non-continuous due to the low speed operation necessary for adequate slow roll performance. For example, the controller 58 can control the control valve 56 to provide bursts of supply air to keep the crankshaft moving at predicted or target speed.

Figure 4:
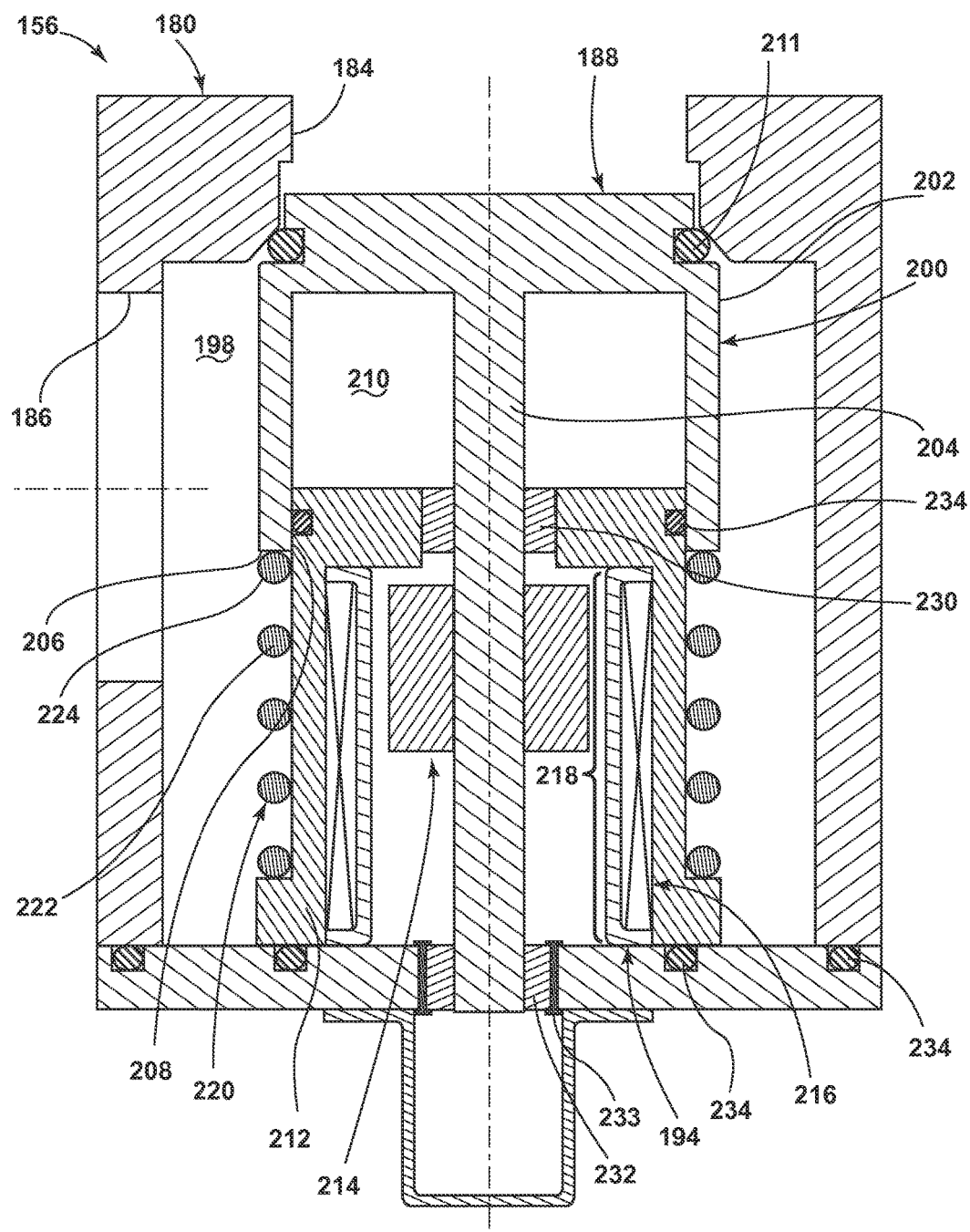
FIG. 4 is a schematic cross-sectional view of a control valve that can be utilized with the air starting system of FIG. 3, and is shown in a closed position.

FIG. 4 illustrates an exemplary control valve 156 according to an embodiment of the invention and that can be utilized in the air starting system 44 as described above. The embodiment of the control valve 156 is similar to the embodiment of the control valve 56. Therefore, like parts will be identified with like numerals increased by 100, with it being understood that the description of the like parts of the control valve 56 applies to the control valve 156, unless otherwise noted.

As with the previous embodiment, the control valve 156 has a housing 180 with an inlet port 184 and an outlet port 186 formed in the housing 180. A flow passage 182 (FIG. 5) is defined through an interior 198 of the housing from the inlet port 184 to the outlet port 186.

One difference is that the valve body 188 is illustrated as including a poppet or piston 200 having a head 202 and a shaft 204 extending from the head 202. The piston 200 is reciprocally movable between opened and closed positions for opening and closing the inlet port 184. Alternatively, the valve body 188 can be designed such that the piston 200 is reciprocally moveable between opened and closed positions for opening and closing the outlet port 186.

The piston 200 can be designed in any suitable manner including, but not limited to, that the head 202 can include a lower end 206 defining an opening 208 to a recess 210. Further, a seal in the form of an O-ring 211 has been illustrated as being operably coupled to the head 202. When the head 202 is in the closed position the O-ring 211 abuts the housing 180 and aids in sealing the inlet port 184.

Another difference is that the linear motor 194 is illustrated as including a housing 212. The housing 212 of the linear motor 194 can be shaped in any suitable manner and can be fixed to the housing 180 of the control valve 156. Further, as illustrated, the linear motor 194 can include a permanent magnet 214 mounted to the shaft 204 of the piston 200 and an electromagnetic coil 216. The permanent magnet 214 resides within the housing 212 of the linear motor 194 and at least a portion of the shaft 204 extends into the housing 212 of the linear motor 194.

As illustrated, the electromagnetic coil 216 can be included within the housing 212 and circumscribes the shaft 204. At least a portion of the housing 212 of the linear motor 194 can be provided within the recess 210 of the head 202. In this manner, at least a portion of the electromagnetic coil 216 can lie within the head 202. The electromagnetic coil 216 defines an interior 218 and the shaft 204 extends through the interior 218 such that the permanent magnet 214 can reciprocate through the interior 218. In this manner, the linear motor 194 and its components can be integrated into or located within the valve body 188 and this provides a compact control valve 156.

Further, a biasing element 220 is included in the control valve 156 and applies a biasing force to the piston 200 to urge the piston 200 to the closed position (FIG. 4). Any suitable biasing element 220 can be utilized including, but not limited to, a compression spring or a coil spring 222 as illustrated. The coil spring 222 has one end 224 abutting the head 202 of the piston 200. In the illustrated example, the coil spring 222 circumscribes the housing 212 of the linear motor 194 and at least a portion of the electromagnetic coil 216 although this need not be the case.

Bearings can be included within the control valve 156 to facilitate movement of the shaft 204. For example, a first bearing 230 is illustrated as being mounted to the housing 212 of the linear motor 194 and circumscribing the shaft 204. A second bearing 232 can be mounted to the housing 180 and circumscribe the shaft 204. More specifically, the bearing 232 is illustrated as being mounted within a flange 233. It will be understood that any number of additional suitable seals or flanges can be included within the valve 156. Both the first and second bearings 230 and 232 allow for linear movement of the shaft 204 when the head 202 is moved between the opened and closed positions. Further still, a variety of seals 234 can be utilized to seal portions of the control valve 156 from the pressurized air.

Figure 5:
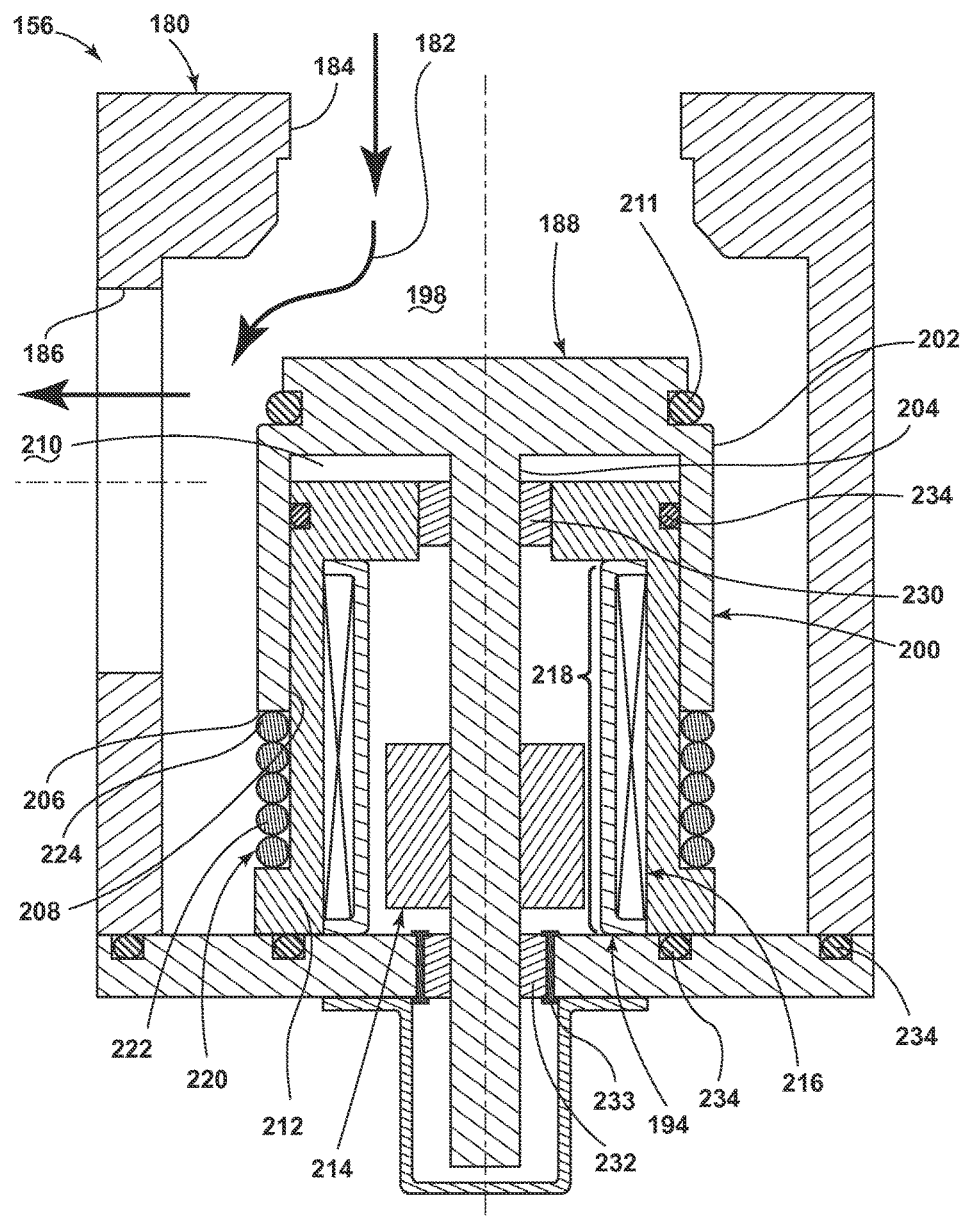
FIG. 5 is a schematic cross-sectional view of the control valve of FIG. 4, and is shown in an opened position.

When electricity is passed through the electromagnetic coil 216 it generates a magnetic field that interacts with the magnetic field of permanent magnet 214 to apply a force to the shaft 204 sufficient to overcome the biasing force of the biasing element 220. More specifically, when electricity is passed through the electromagnetic coil 216 it generates a magnetic field that moves the permanent magnet 214, causing a corresponding movement of the piston 200, resulting in the head 202 moving from the closed position (FIG. 4) to the opened position as illustrated in FIG. 5. This allows pressurized air to flow from the inlet port 184 through the flow passage 182 to the outlet port 186. The linear motor 194 moves the head 202 between the closed and opened positions in a response time of 30 ms or less.

During operation of the pressure source 54, pressurized air is received at the inlet port 184. The force of the air acts on the valve body 188 to try and push the valve body 188 away from the inlet port 184 and open the control valve 156. The coil spring 222 and the linear motor 194 produce a force that counteracts the pneumatic force of the pressurized air and keeps the control valve 156 closed. More specifically, absent a countering force from the linear motor 194 the coil spring 222 urges the valve body 188 closed. Further, when voltage with a specific polarity is applied to the electromagnetic coil 216, the magnetic field produced by the electromagnetic coil 216 interacts with the magnetic field of the permanent magnet 214 and produces a force that drives the piston 200 towards the inlet port 184. The O-ring 211 in the valve body 188 seals against the valve housing 180, and the valve body 188 closes and prevents air from entering the inlet port 184.

When the control valve 156 is to be opened, the voltage polarity on the linear motor 194 is reversed. With current flowing the opposite direction through the electromagnetic coil 216, a force is generated that acts to pull the valve body 188 away from the inlet port 184. The pull force generated by the linear motor 194, combined with the push force of the pressurized air, moves the valve body 188 away from the inlet port 184, allowing air to enter the inlet port 184 and exit through the outlet port 186.

Conversely, when the control valve 156 needs to close again, the voltage polarity on the linear motor 194 is reversed once again, and the force of the linear motor 194 and force of the coil spring 222 act to push the valve body 188 back towards the inlet port 184, sealing the inlet port 184 to the pressurized air, closing the control valve 156 once again. By cycling the voltage polarity of the linear motor 194, the control valve 156 can be quickly opened and closed to rapidly modulate the flow of air through the control valve 156.

The above-described embodiments provide a variety of benefits including that a fast response pneumatic valve can fully open in approximately 30 ms, can modulate inlet pressures as high as 50 psig, can open with inlet pressures as high as 150 psig, and can accommodate flow rates at least as high as 1700 scfm. The above-described embodiments can be electrically actuated and can be utilized in systems that require introducing high air flow in a relatively short period of time. Further, the above-described embodiments can be utilized in systems that require cutting off high air flow in a relatively short period of time. Further, the size and weight of the above-described embodiments are smaller, lighter, more reliable, and less costly than contemporary solutions and the above-described embodiments do not rely on internal feedback and provide basic on/off functionality.

Further still, the above-described embodiments provide real time response and live feedback and therefore can be utilized in systems that rely on closed-loop feedback. More specifically, when a signal is given to the above-described embodiments, the output response, in terms of air flow scfm, is targeted to occur within 30 ms or less. Such a minimal lag between an input signal and output response is critical for pneumatic systems that utilize relatively high flow rates and need real-time response to live feedback. For example, the minimal lag is important during a slow roll start because the starter system will otherwise not shut off in time and if there is a problem, such as when there is water in the cylinder heads, the engine can be damaged as the pistons continue to reciprocate.

To the extent not already described, the different features and structures of the various embodiments can be used in combination with each other as desired. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A control valve comprising:
   a housing defining an interior, with an inlet port fluidly coupled to a fluid source and an outlet port formed in the housing, wherein a flow passage is defined through the interior from the inlet port to the outlet port;

a piston having a head and a shaft extending from the head and reciprocally movable between opened and closed positions for opening and closing the flow passage, a fluid received through the inlet port from the fluid source and exerting a push force upon the piston head to urge the piston toward an open position;

a biasing element applying a biasing force to the piston to urge the piston to the closed position; and a linear motor including a permanent magnet mounted to the shaft and an electromagnetic coil circumscribing the shaft;

wherein when electricity is passed through the electromagnetic coil it generates a magnetic field that interacts with the permanent magnet to apply a force to the shaft which when combined with the push force exerted by the fluid from the fluid source is sufficient to overcome the biasing force to cause a movement of the piston from the closed position to the opened position.

2. The control valve of claim 1 wherein the flow passage is sized to permit a flow rate of at least 900 scfm.

3. The control valve of claim 2 wherein the linear motor moves the head between the closed and opened positions in a response time of 30 ms or less.

4. The control valve of claim 3 wherein the flow rate is at least up to 1700 scfm and the response time is less than 25 ms.

5. The control valve of claim 1 wherein the biasing element includes a coil spring having one end abutting the head of the piston.

6. The control valve of claim 5 wherein the linear motor includes a housing and the coil spring circumscribes the housing of the linear motor.

7. The control valve of claim 6 wherein the head has a lower end defining an opening to a recess and at least a portion of the housing of the linear motor is provided within the recess.

8. The control valve of claim 7 wherein the electromagnetic coil resides within the housing of the linear motor, at least a portion of the shaft extends into the housing of the linear motor, and the permanent magnet resides within the housing of the linear motor.

9. The control valve of claim 8 wherein the housing of the linear motor is fixed to the housing of the control valve.

10. The control valve of claim 9, further comprising a bearing circumscribing the shaft and mounted to the housing of the linear motor.

11. An air starting system for an engine comprising:
a pressurized air source;
an air starter; and
a control valve including a housing defining a flow passage with an inlet port fluidly coupled to the pressurized air source and an outlet port fluidly coupled to the air starter, a valve body movable between an opened and closed positions to selectively open and close one of the inlet and outlet ports, resulting in a corresponding opening and closing of the control valve, air from the pressurized air source received through the inlet port and exerting a push force upon the valve body to urge the valve body toward an open position, a biasing element applying a biasing force to the valve body to urge the valve body to the closed position, and a linear motor comprising a linear motor housing located within the housing of the control valve wherein at least a portion of the linear motor housing is further located within the valve body and operably coupled to the valve body to move the valve body between the opened and closed positions, the linear motor applying a force to the valve body which when combined with the push force exerted by the air from the pressurized air source is sufficient to overcome the biasing force to cause a movement of the valve body from the closed position to the opened position;

wherein the flow passage is sized to permit a flow rate of at least 900 scfm, and the linear motor moves the valve body between the closed and opened positions in a response time of 30 ms or less.

12. The air starting system of claim 11 wherein the flow rate is at least up to 1700 scfm and the response time is less than 25 ms.

13. The air starting system of claim 11 wherein the valve body includes a piston having a head and a shaft extending from the head, and the linear motor includes a permanent magnet mounted to the shaft and an electromagnetic coil, wherein when electricity is passed through the electromagnetic coil it generates a magnetic field that moves the permanent magnet, causing a corresponding movement of the piston, resulting in the head moving from the closed position to the opened position.

14. The air starting system of claim 13 wherein the control valve further includes a biasing element applying a biasing force moving the piston to closed position absent a countering force from the linear motor.

15. The air starting system of claim 14 wherein the electromagnetic coil defines an interior and the permanent magnet reciprocates through the interior.

16. The air starting system of claim 15 wherein the shaft extends through the interior.

17. The air starting system of claim 16 wherein the biasing element includes a coil spring circumscribing the electromagnetic coil.

18. The air starting system of claim 17 wherein the coil spring abuts the head.

19. The air starting system of claim 18 wherein at least a portion of the electromagnetic coil lies within the head.

20. An air starting system for an engine comprising:
a pressurized air source;
an air starter; and
a control valve, comprising:
a housing defining an interior, with an inlet port and an outlet port formed in the housing, wherein a flow passage is defined through the interior from the inlet port to the outlet port and the inlet port is fluidly coupled to the pressurized air source and the outlet port is fluidly coupled to the air starter;
a valve body having a piston having a head and a shaft extending from the head and reciprocally movable between opened and closed positions for opening and closing at least one of the inlet and outlet ports, air from the pressurized air source received through the inlet port and exerting a push force upon the valve body to urge the valve body toward an open position;
a biasing element applying a biasing force to the valve body to urge the valve body to the closed position; and
a linear motor comprising a linear motor housing located within the housing of the control valve wherein at least a portion of the linear motor housing is further located within the valve body and operably coupled to the valve body to move the valve body between the opened and closed positions, the linear motor applying a force to the valve body which when combined with the push force exerted by the air from the pressurized air source is sufficient to overcome the biasing force to cause a movement of the valve body from the closed position to the opened position;

wherein the flow passage is sized to permit a flow rate of at least 900 scfm, and the linear motor moves the valve body between the closed and opened positions in a response time of 30 ms or less.

\* \* \* \* \*